(No Model.)

W. E. JACOBS.
AXLE FOR VEHICLES.

No. 318,118. Patented May 19, 1885.

Witnesses:
B. C. Fenwick
R. L. Fenwick

Inventor:
William E. Jacobs
by his Att'ys
Fenwick & Lawrence

UNITED STATES PATENT OFFICE.

WILLIAM E. JACOBS, OF COLUMBUS, OHIO.

AXLE FOR VEHICLES.

SPECIFICATION forming part of Letters Patent No. 318,118, dated May 19, 1885.

Application filed January 30, 1885. (No model.)

*To all whom it may concern:*

Be it known that I, WILLIAM E. JACOBS, a citizen of the United States, residing at Columbus, in the county of Franklin and State of Ohio, have invented a new and Improved Axle for Vehicles; and I do hereby declare the following to be a full, clear, and exact description thereof, reference being had to the annexed drawings, forming a part of this specification of said invention, in which—

Figure 1:
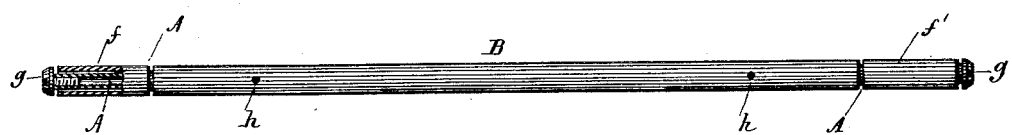
Figure 2:
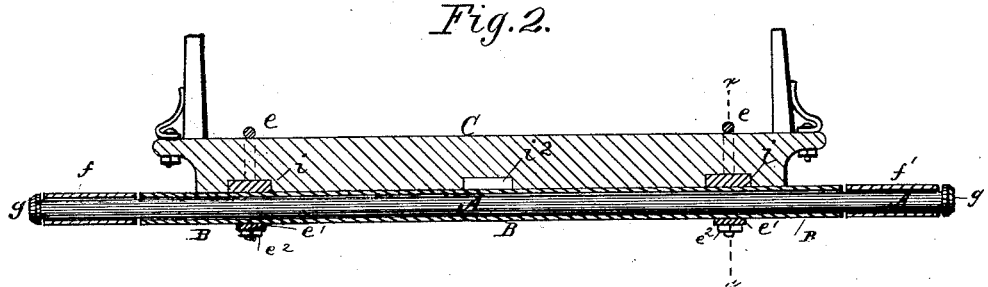
Figure 5:
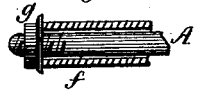
Figure 3:
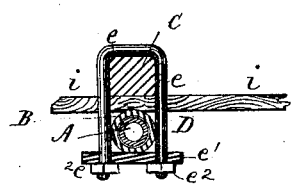
Figure 4:
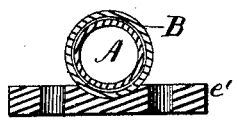

Figure 1 is a plan view of my improved vehicle-axle, one end thereof being sectioned. Fig. 2 is a longitudinal central section of Fig. 1, the inner bar or pipe not being sectioned, the axle being represented as applied to the rear wooden bolster of an ordinary wagon and secured firmly thereto by ordinary "clips;" Fig. 3, a section in the line $x\ x$ of Fig. 2, and Fig. 4 an elarged section of the pipes and clip-plates shown in Fig. 3. Fig. 5 shows a screw-nut to be used in lieu of the shouldered screw shown in Figs. 1 and 2.

The object of this invention is the production of an axle for vehicles which may revolve with the wheels, thereby causing the vehicle to draw easier than when the wheels turn on a stationary spindle; which dispenses with inner shoulders upon its wheel arms or "spindles," thereby avoiding liability to break at such point; which can be oiled without removing its wheels, and which is lighter, more durable, and cheaper than the ordinary axle for vehicles; or, in other words, the principal object of my invention is the production of an axle which shall constitute a straight parallel-sided revolving shaft, upon which the wheel may revolve either with it or around it, or each independently on straight bearings, so that at all times the wheels may have a direct parallel movement, and neither crowd together nor apart, as is the case with stationary tapered spindles "set" to give the wheels a "gather forward."

In the figures, A indicates a tube which, in this instance, constitutes the axle-bar; but the axle-bar may be solid instead of tubular, if desired. This axle-bar is passed through and rotates within a stationary bearing or boxing, or an outer tube, as B, which, as represented in Fig. 2, is firmly confined to the bolster C of an ordinary wagon by means of clips D, as clearly signified in Fig. 3, these clips consisting simply of U-shaped bolts $e$, which pass around the bolster and inclose the tubes A and B on two sides, and confine the tubes in place by bolt-plates $e'$ and screw-nuts $e^2$, as shown.

In Figs. 1 and 2, $f$ and $f'$ indicate the wheel-boxes, the same when in action rotating upon the ends of the axle-bar A, which thus serve as arms or spindles for the wheel-boxes to revolve upon, while shouldered screws, as $g$, are made to confine the wheels upon the axle-bar A, or a nut, as shown in Fig. 5, may be employed in place of the shouldered screws $g$. The plain wheel-boxes effect an easy running of the wagon, as it is evident that in turning with the wagon, especially when one wheel is standing still and the opposite wheel is moving either forward or backward, the inner wheel is liable to bind on the spindle or arm, particularly so when the inner wheel is in a rut or rough place, and thus is liable to cause the axle to remain stationary with the inner wheel, while the outer wheel is free to revolve around the spindle or arm; or the plain wheel-boxes, in connection with the plain axles, will at all times and circumstances permit free action of either the axle in its bearings or in the wheel-boxes, and besides this free action the construction shown admits of shorter arms and hubs being adopted, and consequently the wagon can go in a smaller space and not be so liable to come in contact with other vehicles on the road. In my construction inner shoulders on the axle-arms are not required, and hence the axle can have a plain uniform surface, and no part of it is required to be made square; being without inner shoulders is less liable to break than when made with shoulders, and besides this the cost of its manufacture in the form shown is very slight as compared without shouldered axles.

Supposing my improved axle to be in use, as signified in Fig. 2, and wheels upon the boxes $f f'$, it is apparent that by unscrewing one of the shouldered screws $g$ the shaft or axle-bar A with one of the wheels thereon may be withdrawn from the stationary bearing or boxing B. Holes, as $h$, made through the stationary bearing B will admit a ready oiling of the axle-bar, and without a removal of the wheels. Thus constructed the axle-bar can revolve within the bearing B and with the wheels, or the wheels may rotate upon the axle-bar, thus enabling the vehicle to be drawn with great ease, as the wheels must always run true, even in case the axle should by accident spring a little; and it will be seen that the inner ends of the bearing-box B answer the same purpose as inner shoulders usually formed on the inner ends of ordinary spindle-bearings, and thus I am enabled to form an axle of circular shafting, either cold rolled or turned.

In Fig. 2, $i\ i$ indicate the "wagon-hounds," and $i^2$ the space in the bolster C for the "reach."

It is apparent that in place of the shouldered screws $g\ g$ linchpins may be employed.

One shoulder for retaining a wheel upon the axle-bar may be made upon or integral with the axle-bar; and the axle need not be entirely closed between its spindle-arms, as one or more boxes or bearings between the wheels may be used.

As indicating the state of the art prior to my invention, reference is made to Patents Nos. 190,622 and 227,777.

My invention dispenses with the necessity of using inner fixed or movable shoulders, and I make no claim for anything shown in said patents.

What I claim is—

1. A straight uniform-surfaced revolving axle with tubular bearing or bearings between the wheels and held in its place longitudinally by end shoulders, one or both of which are removable, in combination with the plain wheel-boxes rotating freely upon the wheel-arms either forward or backward, substantially as described.

2. The straight uniform-surfaced revolving axle with removable shoulders at its ends, in combination with a long tubular stationary bearing, the axle forming two arms for wheels, and the bearing inclosing nearly the whole length of the axle between said arms, substantially as and for the purpose described.

WILLIAM E. JACOBS.

Witnesses:
J. D. SULLIVAN,
J. W. WRAY.